(12) United States Patent
Yeom et al.

(10) Patent No.: US 6,282,203 B1
(45) Date of Patent: Aug. 28, 2001

(54) PACKET DATA TRANSMITTING APPARATUS, AND METHOD THEREFOR

(75) Inventors: Yoon-Jong Yeom; Seong-Ho Jeon, both of Kyounggi-do (KR)

(73) Assignee: Hyundai Electronics Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/038,168

(22) Filed: Mar. 11, 1998

Related U.S. Application Data

(63) Continuation-in-part of application No. 08/664,007, filed on Jun. 14, 1996, now abandoned.

(30) Foreign Application Priority Data

Jun. 28, 1995 (KR) .................................................. 95-17950

(51) Int. Cl.$^7$ .................................................. H04Q 11/04
(52) U.S. Cl. .......................... 370/413; 370/389; 370/401; 370/419
(58) Field of Search ................................... 370/216, 389, 370/392, 401, 402, 407, 412, 413, 419, 420, 450

(56) References Cited

U.S. PATENT DOCUMENTS

| | | | |
|---|---|---|---|
| 4,716,408 | 12/1987 | O'Connor et al. | 340/825.5 |
| 4,885,739 | 12/1989 | Read et al. | 370/58.1 |
| 4,887,076 | 12/1989 | Kent et al. | 340/825.16 |
| 4,993,025 | * 2/1991 | Vesel et al. | 370/450 |
| 4,998,247 | 3/1991 | Irvine-Halliday et al. | 370/94.1 |
| 5,041,963 | * 8/1991 | Ebersole et al. | 364/200 |
| 5,079,764 | 1/1992 | Orita et al. | 370/85.13 |
| 5,179,558 | 1/1993 | Thacker et al. | 370/94.3 |
| 5,410,536 | * 4/1995 | Shah et al. | 370/216 |
| 5,469,432 | * 11/1995 | Gat | 370/389 |
| 5,511,221 | 4/1996 | Kaneko | 395/800 |
| 5,513,182 | 4/1996 | Kawamura et al. | 370/94.3 |
| 5,570,361 | 10/1996 | Norizuki et al. | 370/60.1 |
| 5,940,392 | * 8/1999 | Lo et al. | 370/392 |

* cited by examiner

*Primary Examiner*—Douglas Olms
*Assistant Examiner*—Shick Hom
(74) *Attorney, Agent, or Firm*—McGuireWoods LLP

(57) ABSTRACT

A packet data transmitting apparatus includes: a number of nodes for mutually transmitting and receiving packet data; a number of transmitting buffers for storing the packet data received from the nodes; a hardware router disposed between the nodes, for sequentially checking the nodes to find whether each node has the packet data to be transmitted, for reading the packet data from a transmitting buffer of the node to detect an address of a destination node, and for transmitting the packet data stored in the transmitting buffer to the destination node; and a number of receiving buffers for storing the packet data received from the hardware router.

14 Claims, 8 Drawing Sheets

CONVENTIONAL DEVICE

PACKET DATA TRANSMITTING APPARATUS, AND METHOD THEREFOR

This present invention is a continuation in part of application Ser. No. 08/664,007 filed Jun. 14, 1996, now abandoned.

BACKGROUND OF THE INVENTION

1. Field of the Invention

The present invention relates to a packet data transmitting apparatus and a method therefor, in which packet data consisting of packets are transmitted to the destination by using a hardware router.

2. Description of the Prior Art

Insofar as methods of transmitting data are concerned, there are a line exchange method and a packet transmitting method.

The line exchange method is mostly used, for example, in the electronic switching method. In this method, communication lines are installed, so that the data would not be delayed but would be transmitted with real time.

However, in the line exchange method, the line is occupied for transmitting the data, and therefore, it happens that the lines cannot be effectively used. Further, the communication expense shows severe differences depending on the magnitude of the communication distance. Further, the communication becomes impossible if the other end has a different communication speed.

On the other hand, the packet method carries out the data transmission by dividing the data into packet units, and is used mostly in systems like the CDMA(code division multiple access) in which control signals and data are exchanged between the communicating parties.

The packet consists of a data unit formed in a predetermined length, and the address of the other communicating party.

In this packet transmitting method, when data are transmitted, a line does not have to be occupied, and therefore, the line can be used effectively. Further, the communication becomes possible even if the other party has a different communication speed.

FIG. 1 illustrates a conventional packet data transmitting apparatus.

As shown in FIG. 1, the conventional packet data transmitting apparatus includes: a serial/parallel converting section 100 for converting the incoming serial data into a parallel data; a central processing unit 101 for temporarily storing the output packet parallel data of the serial/parallel converting section 100, and for detecting an address information so as to convert the logical address into a physical address;

a buffer 102 for storing the output parallel packet data from the central processing unit so as to output them in accordance with the FIFO (first in first out) method; a hardware router 103 for transmitting the output parallel packet data to the relevant destination; and another buffer 104 for storing the packet data transmitted from the hardware router 103 so as to output them in the FIFO method.

In the conventional packet data transmitting apparatus, the serial packet data which are received externally are converted into parallel packet data by the serial/parallel converting section 100. Then, the central processing unit 101 receives the data to store them into the internal memory 101 A in a sequential manner.

The parallel packet data which have been stored in the internal memory 101 A are sequentially read by the central processing unit 101 so as to detect the address information from the packet data. Then the central processing unit 101 converts the logical address to a physical address before outputting it.

The parallel data which have been outputted from the central processing unit 101 are stored in the buffer 102, and are outputted in the FIFO method.

The parallel output data which are outputted from the buffer 102 are inputted into the hardware router 103, and are stored into the buffer 104 of the destination. Then they are outputted in the FIFO method to be transmitted to the destination.

In this conventional packet data transmitting apparatus, the central processing unit reads the destination address of the received data so as to transmit the packet data to the destination.

Therefore, in a system requiring multitasking, an overload is imposed on the central processing unit, thereby lowering the operating performance. In the case where a large amount of packet data is inputted into the central processing unit, errors are liable to occur due to the overload on the central processing unit.

Further, the central processing unit tackles one by one in detecting the address information of the packet data, and therefore, the peripheral circuits of the central processing unit becomes complicated.

SUMMARY OF THE INVENTION

The present invention is intended to overcome the above described disadvantages of the conventional technique. Therefore it is the object of the present invention to provide a packet data transmitting apparatus and a method therefor, in which the destination address of the packet data is detected by using a hardware router, and the packet data are transmitted based on the detected destination address.

In achieving the above object, a hardware router designates respective nodes in a sequential manner to confirm the existence or absence of the packet data to be transmitted, and a destination address is detected from the packet data of the transmitting node so as to discriminate the receiving node.

Therefore, according to the present invention, even without an intervention of the central processing unit, a transmission path is provided for the packet data transmitting node and the receiving node, thereby making it possible to carry out a hardware type packet data communication.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

With reference to FIGS. 2 to 8, the packet data transmitting apparatus and method of the present invention is described below in detail.

Figure 1:
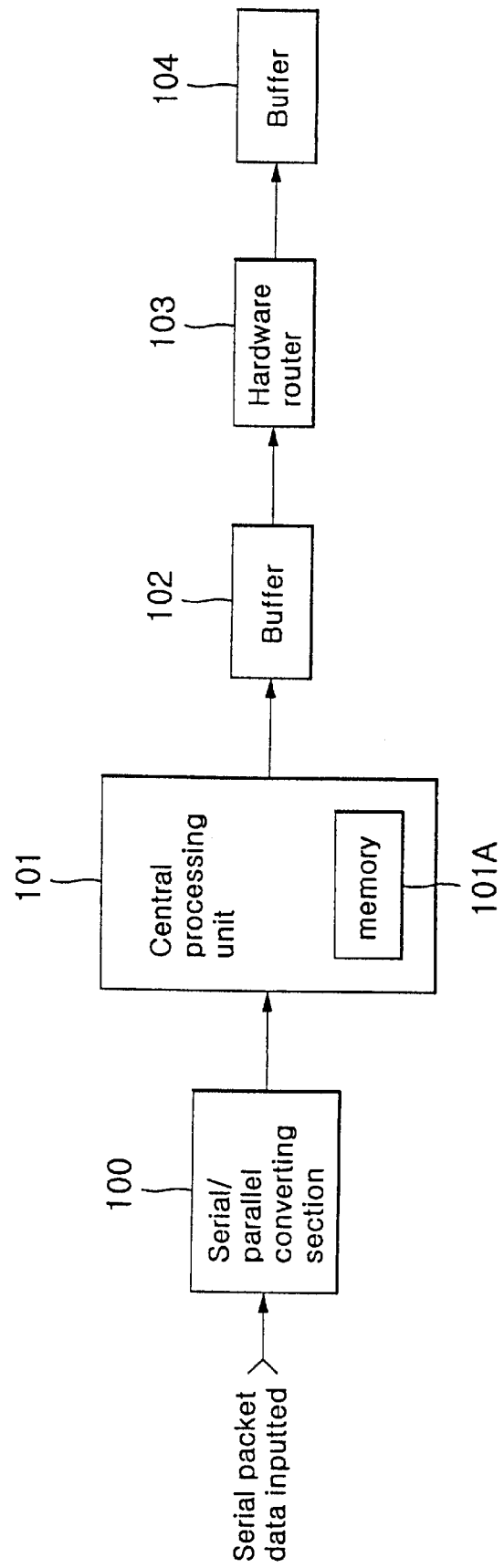
FIG. 1 is a circuit diagram of a conventional packet data transmitting apparatus.
Figure 2:
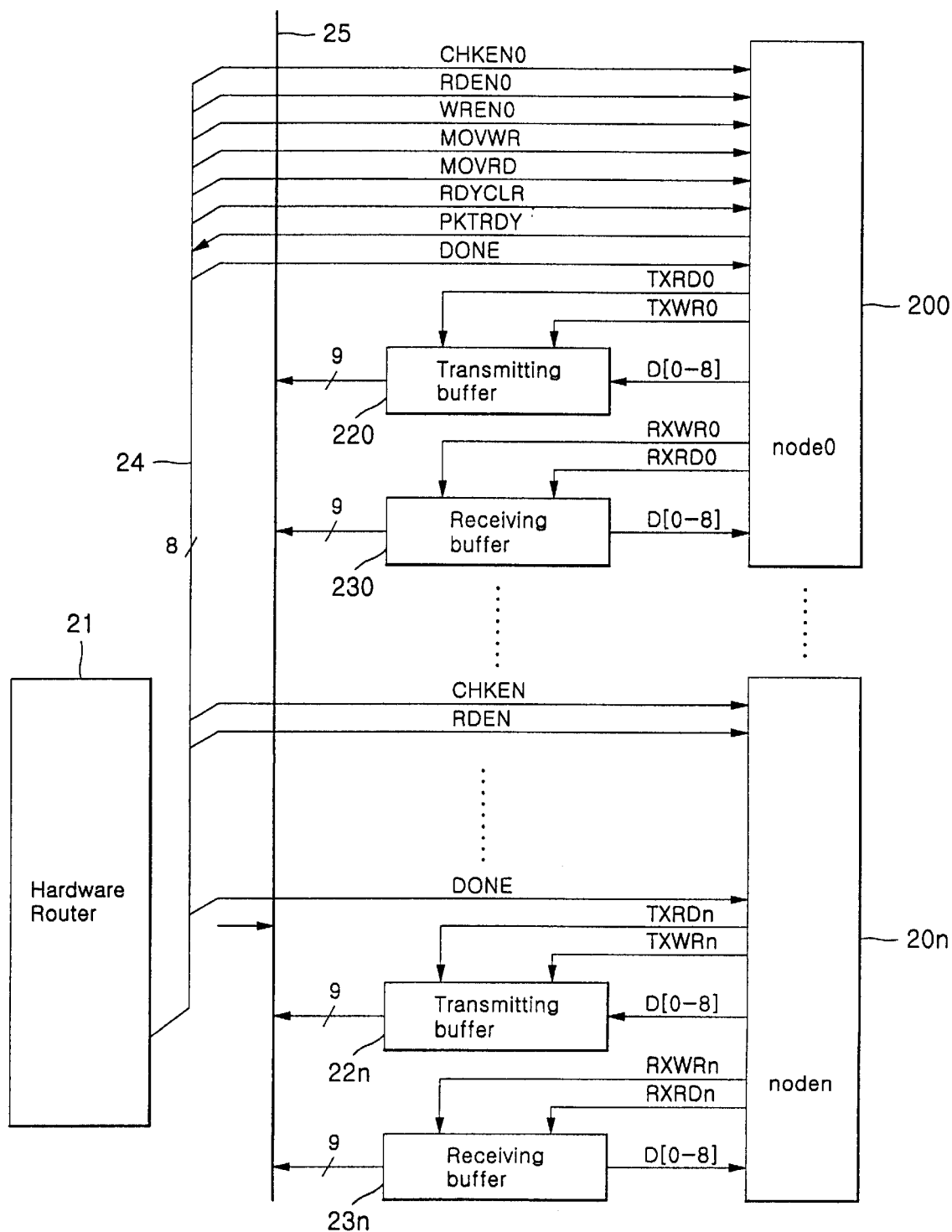
FIG. 2 is a circuit diagram of a packet data transmitting apparatus according to the present invention.

FIG. 2 is a circuit diagram of a packet data transmitting apparatus according to the present invention.

As shown in FIG. 2, the packet data transmitting apparatus of this invention includes: a number of nodes 200 to 20n for mutually transmitting and receiving packet data; a hardware router 21 disposed between the multiple nodes 200 to 20n, for detecting an address of a destination node from the packet data received from each node 200 to 20n so as to transmit it to a destination node; a number of transmitting buffers 220 to 22n for storing the packet data transmitted from the nodes 200 to 20n and supplying it to the hardware router 21; and a number of receiving buffers 230 to 23n for storing the packet data transmitted from the hardware router 21 and supplying it to each corresponding node. Reference numbers 24 and 25 respectively denote a control bus and a data bus.

The following description is about one-to-one communication where a packet is transmitted to the destination node 20n, using the node 200 as a transmitting node. The node 200 supplies a write control signal, TXWRO, to the transmitting buffer 220 and writes the packet to be transmitted to the transmitting buffer 220.

Figure 3:
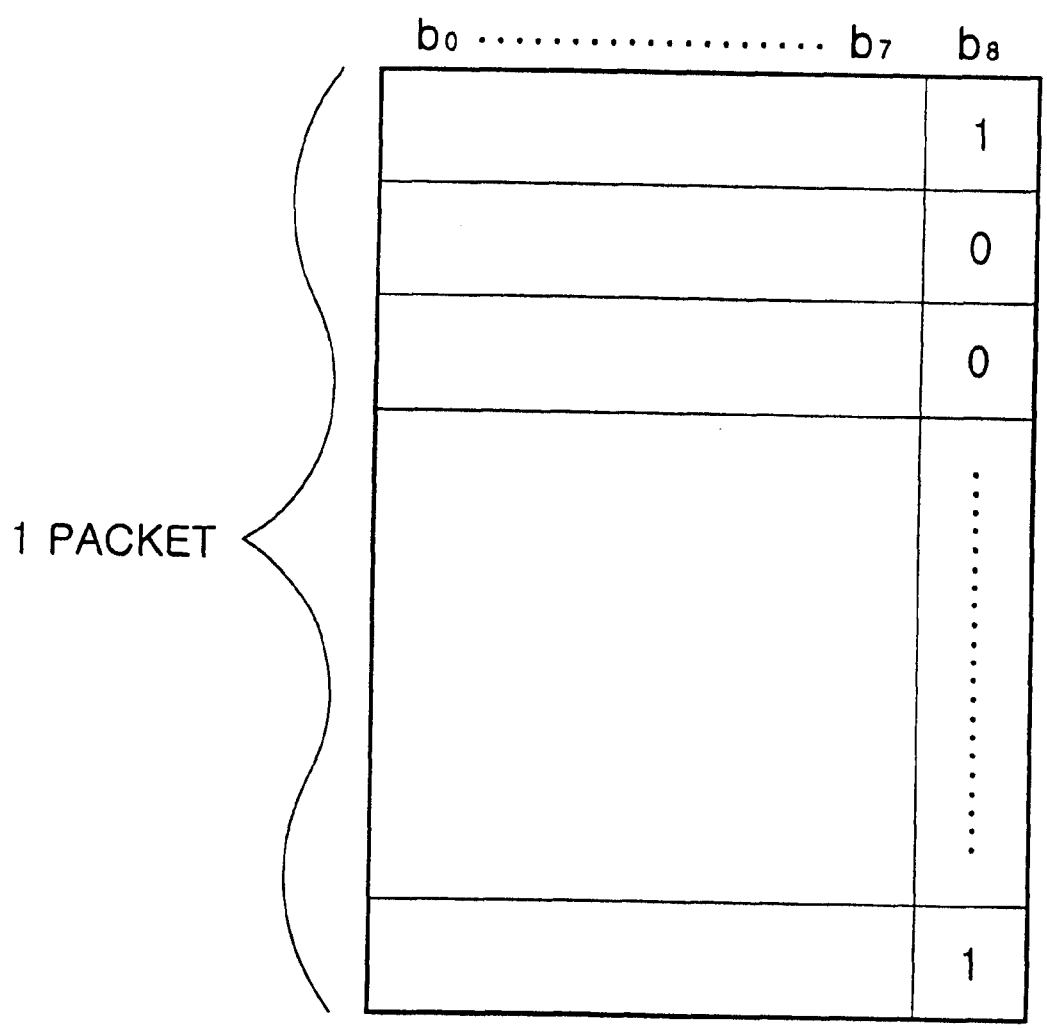
FIG. 3 shows structure of a packet data according to the present invention.

FIG. 3 shows structure of a packet according to the present invention. One packet is composed of multiple bytes. "1" is respectively written to the ninth bits, $b_8$, of the first and last bytes in the packet for indicating a start and an end of the packet. The hardware router 21 checks the ninth bits and detects the start and end of the packet. Once the last byte of the packet is written to the transmitting buffer 220, the node 200 sends a packet ready signal, PKTRDY, to the hardware router 21 via the control bus 24 to inform that a packet is ready. In this embodiment, ninth bits are utilized for indicating the start and end of the packet, but the fact which bit is used for indicating the start and end of the packet does not have an influence on achievement of objectives of this invention.

Figure 4:
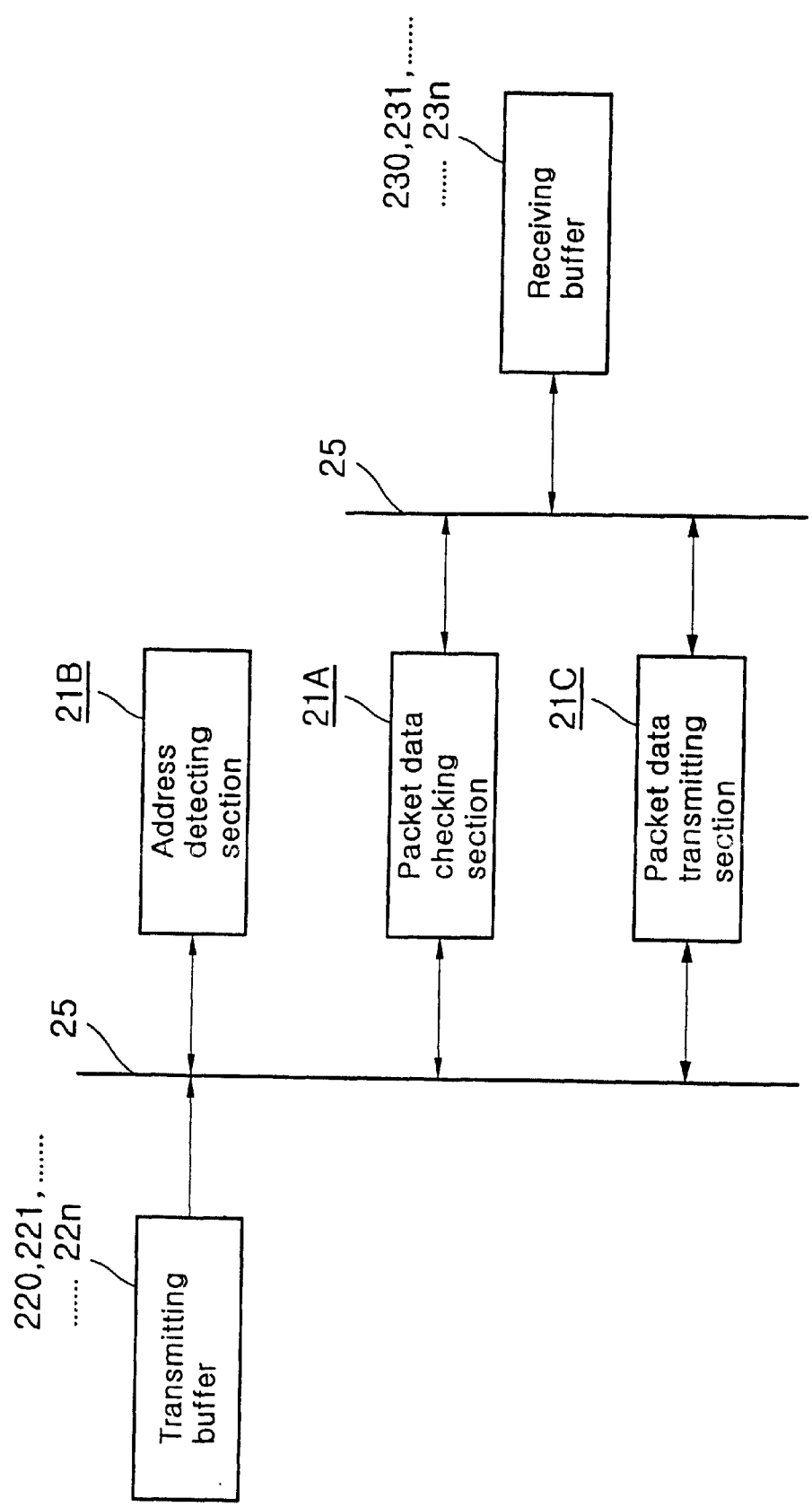
FIG. 4 is a block diagram of a hardware router according to the present invention.

FIG. 4 is a block diagram of a hardware router of the present invention. The hardware router 21 includes: a packet data checking section 21A for checking each node 200 to 20n to find that the node has a packet to be transmitted; an address detecting section 21B for detecting a destination node's address contained in the packet data which has been checked by the packet data detecting section; and a packet data transmitting section 21C for transmitting the packet data to the destination based upon the destination address detected by the address detecting section 21B.

The packet data checking section 21A, which sequentially checks the nodes 200 to 20n, sends ready check signals, CHKEN0 to CHKENn, to each node 200 to 20n for determining whether the packet ready signal, PKTRDY, is inputted to each node. Only when receiving the ready check signals, CHKEN0 to CHKENn, each node outputs the packet ready signal, PKTRDY. Otherwise the nodes make their output terminals for the PKTRDY stay in TRI-STATE.

If the packet data detecting section 21A receives the packet ready signal, PKTRDY, from the transmitting node 200, it sends a transmission request signal, REQ, to the packet data transmitting section 21C. If a request acknowledgement signal, ACK, is received from the packet data transmitting section 21C as a response, the packet data checking section 21A sends a signal, RDYCLR, for clearing the packet ready signal, PKTRDY, to the corresponding transmitting node 200 and then continuously checks the next node 201.

When the packet data transmitting section 21C receives the transmission request signal, REQ, from the packet data checking section 21A, it sends a read enable signal, RDENO, to the corresponding transmitting node 200 and also sends the request acknowledgement signal, ACK, to the packet data checking section 21A as the response. The packet data transmitting section 21C reads the transmitting buffer 220 of the transmitting node 200 which is enabled by the read enable signal, RDEN, and continuously sends the data read to the address detecting section 21B until a packet address field is detected. If the address detecting section 21B detects an address and outputs a write enable signal, WRENn, for enabling the corresponding destination node 20n, a data route is formed between the transmitting buffer 220 of the transmitting node 200 and the receiving buffer 23n of the destination node 20n. After transmitting the data from the start to the address field remained in the address detecting section 21B to the receiving buffer 23n, the packet data transmitting section 21C reads the data from the transmitting buffer 200 220 (MOVRD) and writes it to the receiving buffer 23n (MOVWR). If the transmission is completed, the packet data transmitting section 21C outputs a signal, DONE, for informing the completion of packet transmission and making the destination node 20n read data from the receiving buffer 23n. The packet data transmitting section 21C then continuously checks the transmission request signal, REQ, of the packet data checking section 21A. If the transmission request signal, REQ, is inputted thereto, the packet data transmitting section 21C repeats the above procedure.

Figure 5:
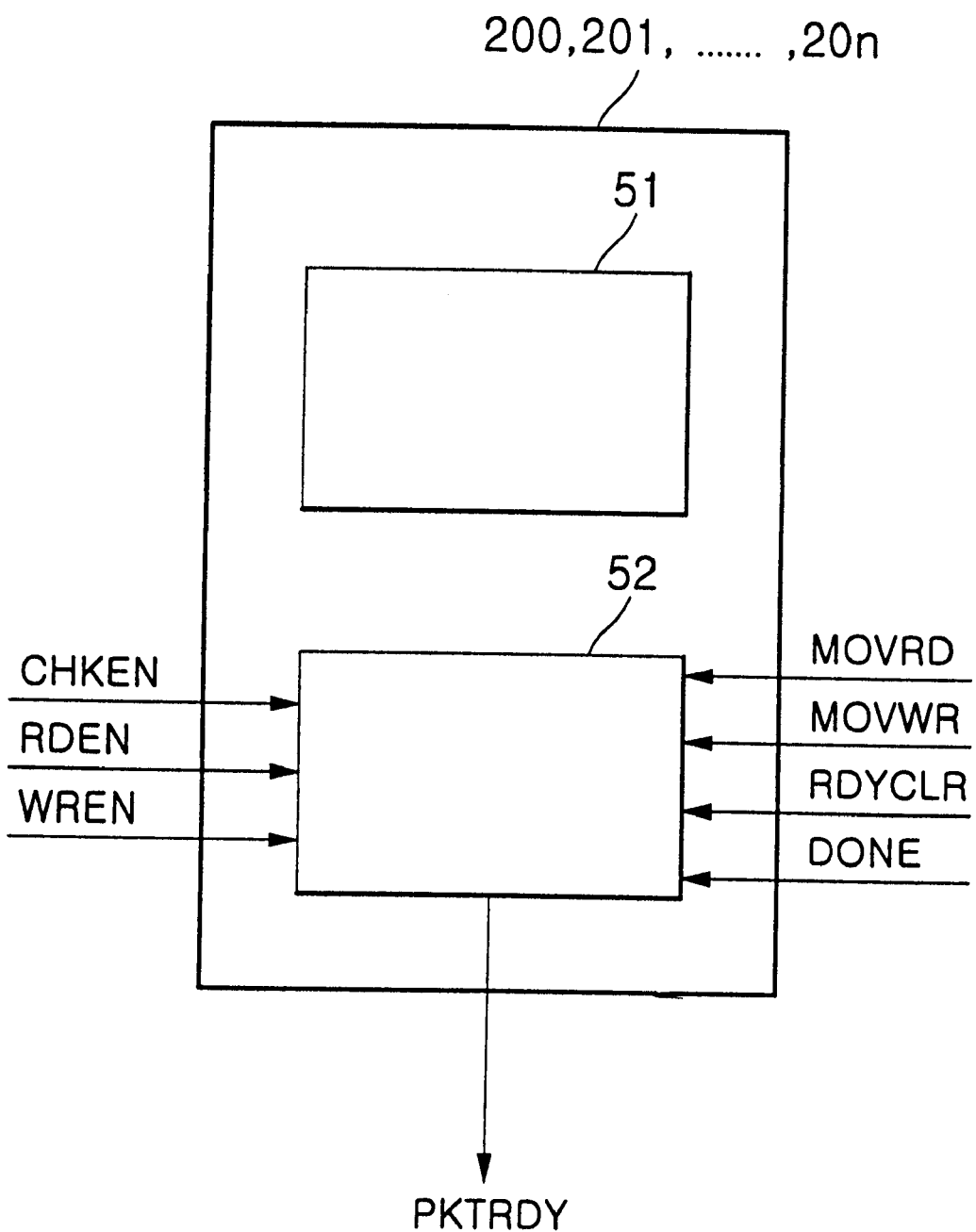
FIG. 5 is a block diagram of a node according to the present invention.

FIG. 5 is a block diagram of a node according to the present invention.

Each node 200 to 20n has a microprocessor 51 and a router matching unit 52. When writing the packet to be transmitted to the transmitting buffer 220 to 22n having a 9-bit bus width (D0–D8), the router matching unit 52 writes "1" to the respective last bits, $b_8$, of the first and last bytes in the packet and "0" to the last bit, $b_8$, of the center byte(s). This is for allowing the hardware router 21 to detect the start and end of the packet. When reading the transmitting buffer 220 to 22n, the hardware router 21 checks the ninth bits, $b_8$, of each byte. In such configuration, it is not necessary to add special data to both ends of the packet for informing the start and end of the packet, thereby saving storage space for data and promoting the efficiency of data process.

Figure 6:
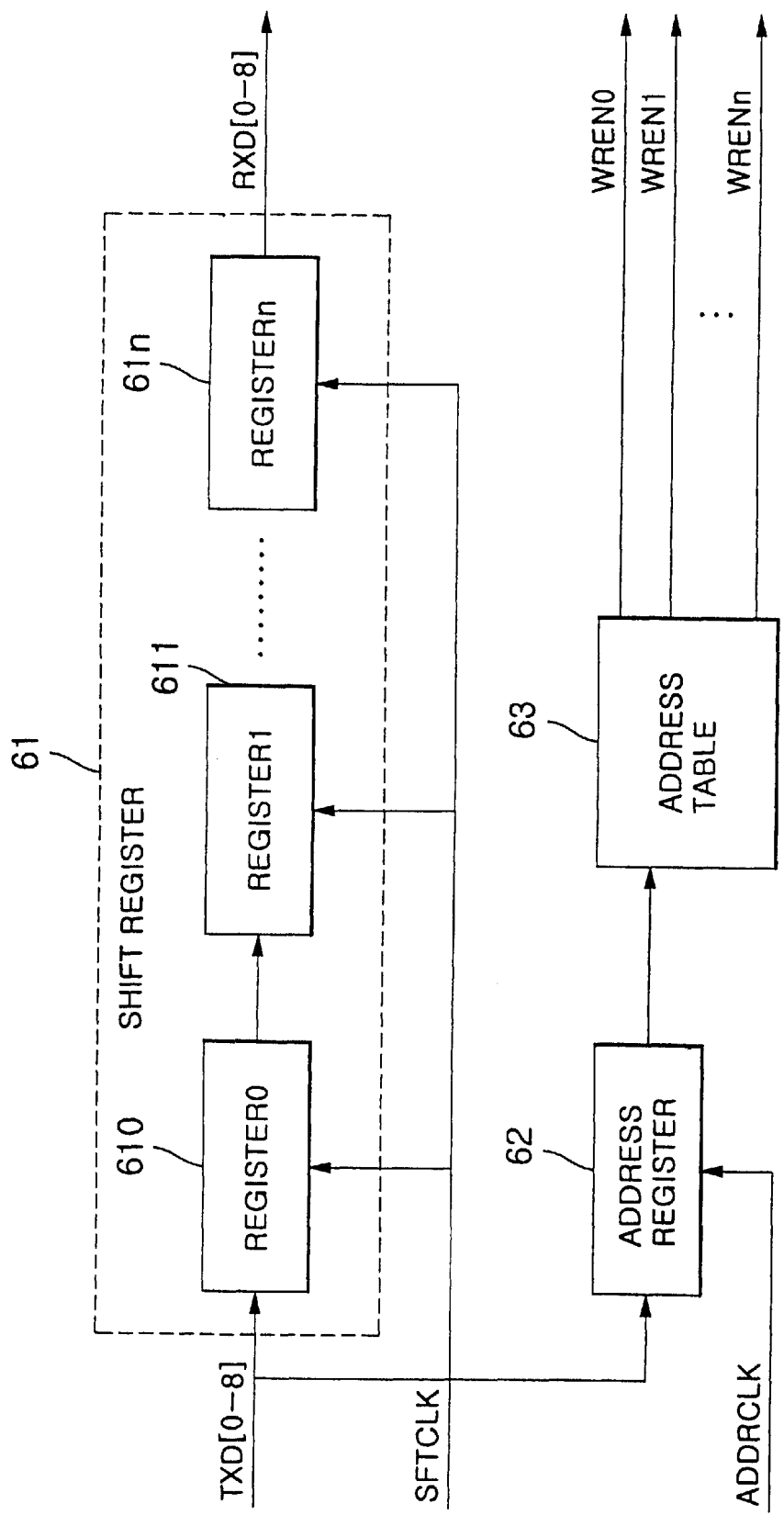
FIG. 6 is a block diagram of an address detecting section according to the present invention.

FIG. 6 is a block diagram of an address detecting section according to the resent invention. The address detecting section 21B includes: a shift register unit 61 having a number of shift registers 611–61n mutually connected in serial, for receiving and shifting data TXD from the transmitting buffers 220 to 22n so as to send the data to the receiving buffers 230 to 23n; an address register 62 for extracting address data from the data TXD and outputting the address data; and an address table 63 for decoding the address data received from the address register 62 and sending a write enable signal to a receiving node corresponding to the address.

For example, when a packet is transmitted from the first node 200 to the nth node 20n, the address detecting section 21B detects an address of the receiving node and sends the write enable signal, WRENn, to the destination node 20n according to the following procedure.

The packet data transmitting section 21C reads data from the transmitting buffer 220 and sends it to the shift register unit 61 and address register 62. The address register 62 receives packet data from the transmitting buffer 220. When an address field is inputted to the address register 62, an address clock, ADDRCLK, is high, so the address register 62 fetches address data and sends it to the address table 63. The address table 63 decodes the address data received from the address register 62 and sends the write enable signal, WRENn, to the destination node 20n corresponding to the address. At this time, the shift register unit 61 has shift registers as many as the number of bytes contained in the packet data area from the start to the address field in order to shift the packet data until the address is detected from the packet data. Therefore, the packet data read from the transmitting buffer 220 is stored in the shift registers 611 to 61n without loss until the address data is detected. Once the address is detected, a route to the destination node 20n is made, so the packet data is transmitted from the shift register unit 61 to the receiving buffer.

Since the address detecting section 21B decodes the address field of the packet and enables the data route to the destination node, when simultaneously transmitting the packet from a receiving node to many other nodes, transmission can be easily achieved in such a manner of altering the address field data and decoding the corresponding address according to the altered data with the address table. For example, the address table 63 is designed to send the write enable signal, WREN, to all nodes when the address field is FF(HEX), and to write enable signals, WREN0, WREN2, WREN4, and WREN6 to the nodes 200, 202, 204, and 206 when the address field is 33(HEX). If the address field is one byte, it is possible to constitute the address table 63 where selection of $2^8$=256 addresses is available.

Such structure allows simultaneous transmission of a packet from a transmitting node to other nodes regardless of the number of desired receiving nodes.

Figure 7:
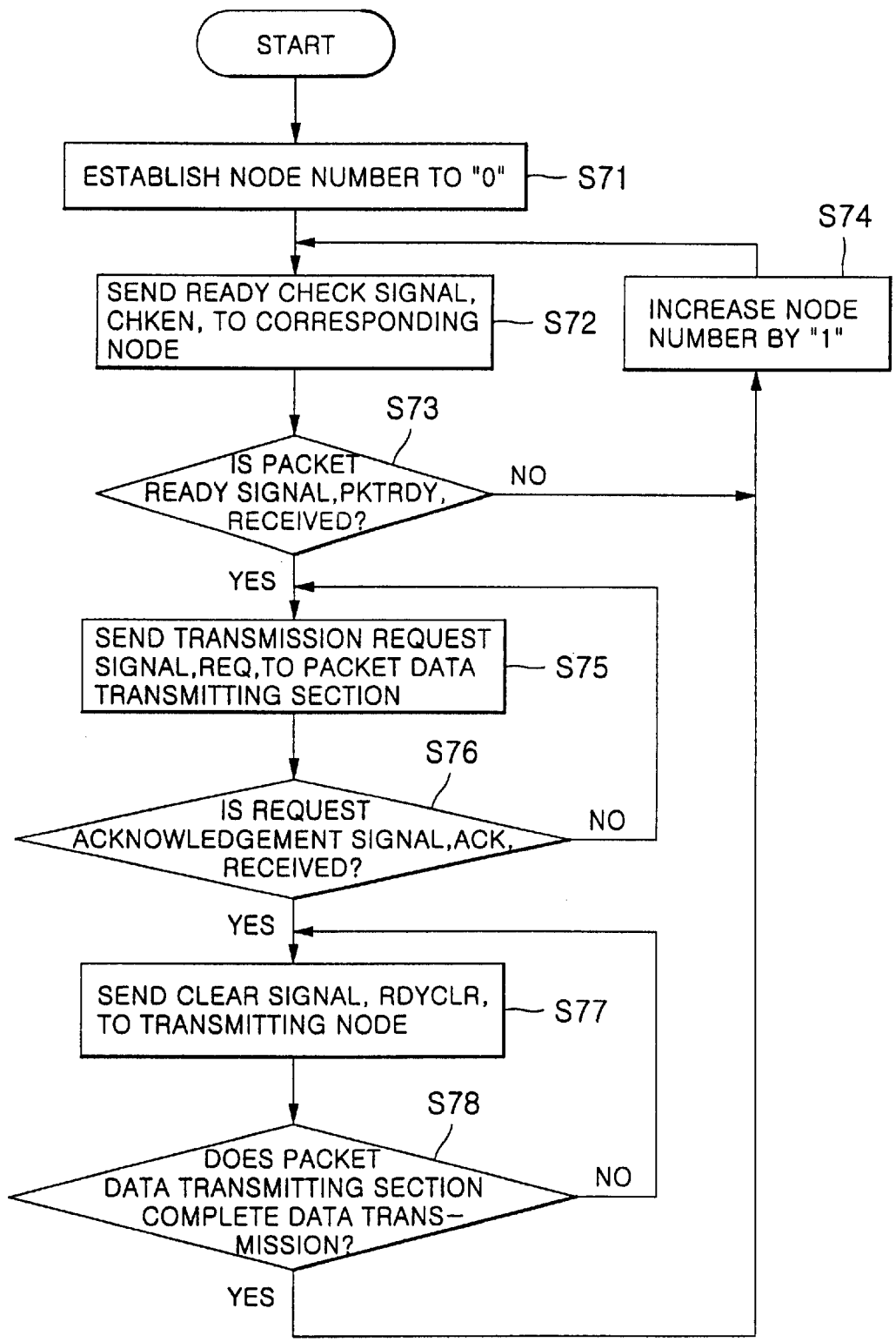
FIG. 7 is a flow chart of a packet data checking routine according to the present invention.

FIG. 7 is a flow chart showing how the packet data checking section forms a data route between a transmitting node and destination node according to the present invention.

A numerical symbol for a node to be checked is established to "0" (step S71). A ready check signal, CHKEN0, is sent to the corresponding node 200 to designate the node (step S72). The packet data checking section 21A determines whether a packet ready signal, PKTRDY, is received from the designated node 200 (step 73). If the packet ready signal is not received, the node number is increased by "1" and the step S72 is repeated (step S74). If the packet ready signal is received, a transmission request signal, REQ, is sent to the packet data transmitting section 21C (step S75). Whether or not a request acknowledgement signal, ACK, is received from the packet data transmitting section 21C is determined (step S76). If the request acknowledgement signal is not received, the step S75 is repeated. If it is received, a clear signal, RDYCLR, is sent to a transmitting node (step S77). Whether the packet data transmitting section 21C completes data transmission is determined (step S78). If the transmission is not completed, the step S77 is repeated. If it is completed, the step S74 is repeated.

Figure 8:
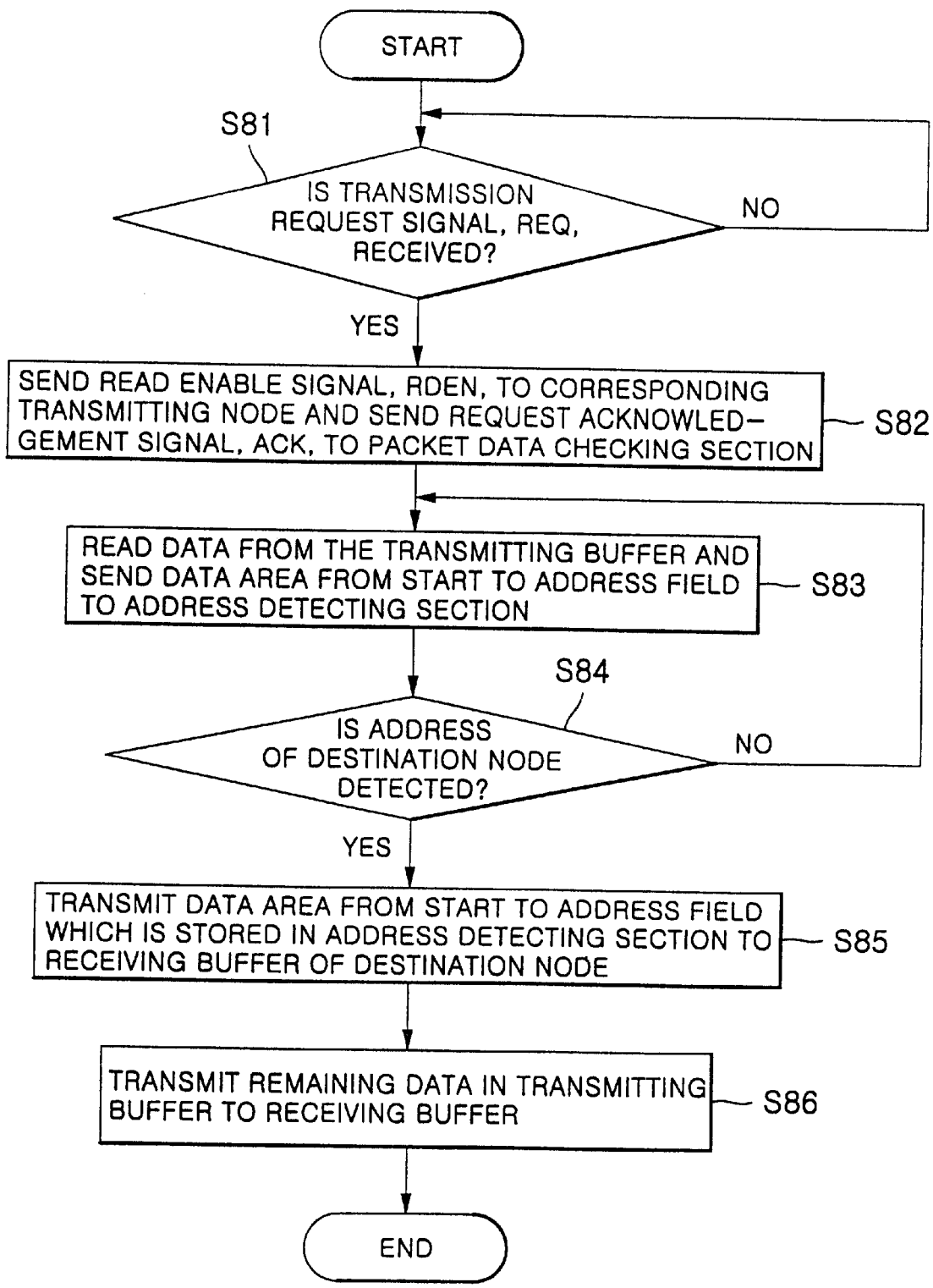
FIG. 8 is a flow chart of a packet data transmitting routine according to the present invention.

FIG. 8 is a flow chart showing how the packet data transmitting section transmits packet data from a transmitting node to destination node according to the present invention.

Whether the transmission request signal, REQ, is received from the packet data checking section 21A is determined (step S81). If the transmission request signal, REQ, is not received, the step S81 is repeated. If it is received, a read enable signal, RDEN, is sent to a corresponding transmitting node and the request acknowledgement signal, ACK, is sent to the packet data checking section 21A (step S82). The data of the transmitting buffer is read and the data area from the start to the address field is sent to the address detecting section 21B (step S83). Whether the address of the destination node is detected is determined (step S84). If the address of the destination node is not detected, the step S83 is repeated. If it is detected, the data area from the start to the address field stored in the address detecting section 21B is sent to the receiving buffer of the destination node (step S85). The remaining data in the transmitting buffer is transmitted to the receiving buffer (step S86).

According to this invention as illustrated above, the hardware router directly detects the address of the destination from the packet data to be transmitted and sends the address to the corresponding node, thereby preventing an over-load on the central processing unit. Consequently, the operational performance of the central processing unit is improved, resulting in improvement of the system processing speed. Therefore, the present invention can be applied to a system requiring a multitasking or accurate high speed packet routing.

It will be apparent to those skilled in the art that various modifications and variations can be made in a packet data transmitting apparatus and method therefor of the present invention without deviating from the spirit or scope of the invention. Thus, it is intended that the present invention cover the modifications and variations of this invention provided they come within the scope of the appended claims and their equivalents.

What is claimed is:

1. A packet data transmitting apparatus comprising:
   a number of nodes for mutually transmitting and receiving packets;
   a number of transmitting buffers for storing packets received from the nodes;
   a number of receiving buffers for storing packets received from the hardware router; and
   a hardware router, disposed between the nodes, for sequentially checking the nodes to find whether one of the nodes has packet data to be transmitted, for reading said packet data from one of said transmitting buffers of said one of the nodes to detect an address of a destination node, and for transmitting said packet data stored in the transmitting buffer to the destination node,
   wherein the hardware router comprises:
   (a) a packet data checking station for checking the nodes to find said one of the nodes having said packet data to be transmitted;
   (b) an address detecting section for detecting a destination node address contained in said packet data found by the packet data detecting section; and
   (c) a packet data transmitting section for transmitting said packet data to a destination based upon the destination node address detecting by the address detecting section, and,
   wherein the address detecting section comprises:
   (a) a shift register unit having a number of shift registers mutually connected in series, for receiving and shifting said packet data from the transmitting buffer so as to send said packet data to one of said receiving buffers;

(b) an address register for extracting address data from said packet data and outputting the address data; and (c) an address table for decoding the address data received from the address register and sending a write enable signal to the destination corresponding to the destination node address.

2. The apparatus according to claim 1, wherein said one of the nodes comprises:

a microprocessor; and a router matching unit for writing a predetermined value to at least one bit of first and last bytes in said packet data and a second predetermined value to at least one bit of a center byte in said packet data when writing said packet data to be transmitted to the transmitting buffer.

3. The apparatus according to claim 1, wherein the transmitting buffer has a 9-bit width.

4. The apparatus according to claim 1, wherein the packet data checking section sequentially sends a ready check signal to said one of the nodes, sends a transmission request signal to the packet data transmitting section when a packet ready signal is received from said one of the nodes, and sends a signal for clearing the packet ready signal of said one of the nodes when a request acknowledgment signal is received from the packet data transmitting section.

5. The apparatus, according to claim 1, wherein, upon receiving the transmission request signal from the packet data checking station, the packet data transmitting section reads the transmitting buffer of said one of the nodes and sends said packet data to the address detecting section until an address of said packet data is detected, and, if the address of the destination node is detected, sends said packet data stored in the transmitting buffer to one of said receiving buffers associated with the destination node.

6. The apparatus according to claim 1, wherein the packet data transmitting section detects first and last bytes of said packet data by retrieving a predetermined value stored in at least one bit of said first and last bytes.

7. The apparatus according to claim 1, wherein the shift register unit has shift registers as many as a number of bytes contained in a packet data area of said packet data from a start to an address field.

8. The apparatus according to claim 1, wherein the address register detects an address field from said packet data according to an address clock received from the packet data transmitting section.

9. The apparatus according to claim 1, wherein the address table decodes the address data received from the address register and detects a destination node so as to send a write enable signal to the destination node address.

10. The apparatus according to claim 1, wherein the address table decodes address data designating the destination node and sends a write enable signal the destination node.

11. A packet data transmitting method comprising the steps of:

(1) establishing a numerical symbol of a node to be checked to "0";

(2) sending a ready check signal to the node corresponding to the numerical symbol, and determining whether a packet ready signal is received;

(3) if the packet ready signal is not received, increasing the numerical symbol of the node to be checked;

(4) repeating steps (2) and (3) until a packet ready signal is received from the node being checked;

(5) once the packet ready signal is received, sending a transmission request signal to a packet data transmitting section;

(6) determining whether or not a request acknowledgment signal is received from the packet data transmitting section;

(7) if the request acknowledgment signal is not received, repeating the step of sending the transmission request signal (step (5)) and, if it is received, sending a clear signal to a transmitting node which has outputted the packet ready signal;

(8) determining whether the packet data transmitting section completes data transmission, waiting for the transmission completion if the transmission is not completed, and repeating step (3) if the transmission is completed;

(9) determining whether the transmission signal request is not received from a packet data checking section;

(10) repeating step (9) if the transmission request signal is not received, and respectively sending a read enable signal and the request acknowledgment signal to a corresponding transmitting node and to the packet data checking section if the transmission request signal is received;

(11) reading data from a transmitting buffer and sending a data area from a start to an address field to an address detecting section;

(12) determining whether the address detecting section detects an address of a destination node;

(13) repeating step (11) if the address of the destination node is not detected, and sending the data area from the start to the address field stored in the address detecting section to the receiving buffer of the destination node if the address of the destination node is detected; and

(14) transmitting remaining data in the transmitting buffer to a receiving buffer, wherein steps (1) to (8) are controlled by the packet data checking section and steps (9) to (14) are controlled by the packet data transmitting section.

12. The method according to claim 11, wherein said packet data checking section and said packet data transmitting section are included in a hardware router.

13. A method for transmitting packet data, comprising the following steps performed in a hardware router:

scanning a plurality of nodes to locate a node ready to transmit packet data;

determining a destination address in said packet data;

transmitting said packet data to a destination node corresponding to said destination address, wherein said determining step includes:

transferring said packet data, byte by byte, from a transmitting buffer associated with said node to said hardware router;

examining, in said hardware router, each byte of said packet data transmitted during said transmitting step to determine whether said byte corresponds to said destination address; and shifting all bytes which do not correspond to said destination address into shift registers for temporary storage, wherein said transmitting step includes transmitting the bytes in said shift registers to the destination node corresponding to said destination address.

14. A packet data transmitting apparatus, comprising a plurality of nodes; and a hardware router including:
  a) means for scanning said nodes to locate a node ready to transmit packet data;
  b) means for determining a destination address in said packet data;
  c) means for transmitting said packet data to a destination node corresponding to said destination address,
  wherein said determining means includes:
    means for transferring said packet data, byte by byte, from a transmitting buffer associated with said node to said hardware router;
    means for examining, in said hardware router, each byte of said packet data transmitted during said transmitting step to determine whether said byte corresponds to said destination address; and
    means for shifting all bytes which do not correspond to said destination address into shift registers for temporary storage, said transmitting means transmitting the bytes in said shift registers to the destination node corresponding to said destination address.

* * * * *